(12) United States Patent
Moriya et al.

(10) Patent No.: US 9,357,591 B2
(45) Date of Patent: May 31, 2016

(54) HIGH-FREQUENCY HEATING APPARATUS

(75) Inventors: Hideaki Moriya, Yamatokoriyama (JP); Haruo Suenaga, Katano (JP); Hisashi Morikawa, Kitakatsuragi-gun (JP); Shinichi Sakai, Nara (JP); Toyotsugu Matsukura, Nara (JP); Nobuo Shirokawa, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 2228 days.

(21) Appl. No.: 10/571,846

(22) PCT Filed: Oct. 15, 2004

(86) PCT No.: PCT/JP2004/015273
§ 371 (c)(1),
(2), (4) Date: Mar. 15, 2006

(87) PCT Pub. No.: WO2005/039245
PCT Pub. Date: Apr. 28, 2005

(65) Prior Publication Data
US 2009/0001073 A1    Jan. 1, 2009

(30) Foreign Application Priority Data
Oct. 16, 2003 (JP) ................... 2003-356615

(51) Int. Cl.
*H05B 6/68*    (2006.01)

(52) U.S. Cl.
CPC ............... *H05B 6/681* (2013.01); *Y02B 40/143* (2013.01)

(58) Field of Classification Search
USPC .................................. 219/678, 721
See application file for complete search history.

(56) References Cited

U.S. PATENT DOCUMENTS

| | | | | |
|---|---|---|---|---|
| 5,699,238 A | * | 12/1997 | Lee et al. | 363/21.03 |
| 6,324,078 B1 | * | 11/2001 | Naruo et al. | 363/17 |
| 6,362,463 B1 | * | 3/2002 | Bessyo et al. | 219/715 |
| 6,437,546 B1 | * | 8/2002 | Kunii et al. | 323/222 |
| 2007/0030705 A1 | * | 2/2007 | Yamamoto et al. | 363/41 |

FOREIGN PATENT DOCUMENTS

| | | |
|---|---|---|
| CN | 1311975 A | 9/2001 |
| JP | 7-45361 | 2/1995 |

(Continued)

OTHER PUBLICATIONS

Chinese Office Action.

*Primary Examiner* — Thien S Tran
(74) *Attorney, Agent, or Firm* — Pearne & Gordon LLP

(57) ABSTRACT

A resonance type high frequency heating apparatus comprising; a direct current power supply; a series connection circuit consisting of a pair of semiconductor switching elements connected in parallel to the direct current power supply; another series connection circuit having a primary coil of a leakage transformer and a capacitor connected to both ends of one of the pair of semiconductor switching elements; and a drive means for driving each of the pair of semiconductor switching elements; wherein a variable dead time preparation circuit is provided in the drive means, and the variable dead time preparation circuit enables dead time to remain constant at below a predetermined frequency and causes the dead time to increase sharply at a point above a predetermined frequency.

12 Claims, 13 Drawing Sheets

(56) References Cited

FOREIGN PATENT DOCUMENTS

| JP | 07-045361 A | 2/1995 | | |
| JP | 2000-58252 | 2/2000 | | |
| JP | 2003-77626 | 3/2003 | | |
| JP | 2003-257604 | * 9/2003 | ............... | H05B 6/12 |
| JP | 2003-259643 | * 9/2003 | ............... | H02M 3/28 |
| JP | 2003-259643 A | 9/2003 | | |
| JP | 2006-257604 | * 9/2003 | ............... | H05B 6/12 |

* cited by examiner

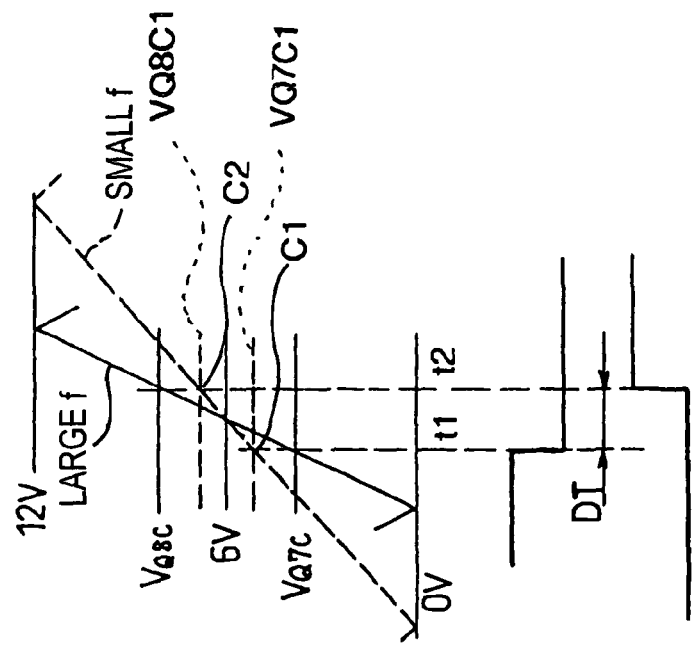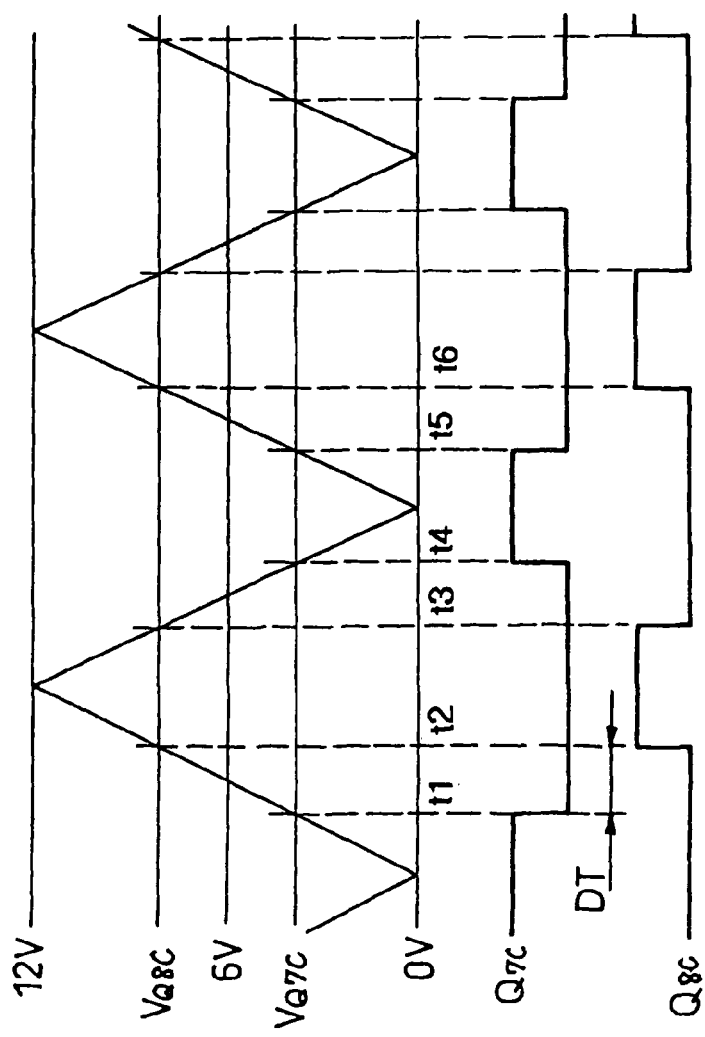
FIG. 6 (a)
FIG. 6 (b)

US 9,357,591 B2

HIGH-FREQUENCY HEATING APPARATUS

TECHNICAL FIELD

The present invention relates to a high frequency heating by use of a magnetron, such as a microwave oven, particularly, to an inverter circuit.

BACKGROUND ART

Conventional power supplies loaded in conventional high frequency heating apparatuses are heavy and large-sized, therefore, downsizing and weight savings have been demanded. To this end, downsizing, weight saving and cost reductions have positively been promoted by enabling switching operation of power supplies in a variety of fields at present. In a high frequency heating apparatus available for cooking foods with microwaves generated by magnetrons, down-sizing and weight savings of the power supply has been demanded, which have practically been realized by inverter circuits driven via switching operation.

Among these, the high-frequency inverter circuit covered by the present invention is a resonant type circuit method by using two switching elements consisting of an arm of the bridge. For example, refer to Japanese Published Unexamined Patent Application No. 2000-58252

In the case of a single transistor type inverter (ON/OFF width control, for example), it is necessary to use a withstand voltage of 1000V between the collector and the emitter of a transistor. In the case of a bridge composed of a pair of transistors, a withstand voltage between the collector and the emitter of a transistor is not always required. Accordingly, when using abridge structure, approximately 600V is sufficient for a withstand voltage between the collector and the emitter, making possible use of an inexpensive transistor as an advantage. In this kind of inverter, inductance L and capacitance C jointly form a resonance circuit, which generates resonant characteristics having the peak resonant frequency f0 as shown in FIG. 1.

FIG. 1 is a diagram showing use frequency characteristics with respect to current when a constant voltage is applied to the inverter resonance circuit according to the present invention. In FIG. 1, frequency f0 indicates a resonant frequency of an LC resonance circuit of the inverter circuit. In this chart, a curve line I1 designating the frequency characteristics with respect to current within a frequency range f1 through f3 above the frequency f0 is used. The current I1 is maximum when the resonant frequency is f0. The current value I1 decreases in proportion as the frequency range rises from f1 to f3. In the frequency range f1 through f3, as the frequency is lowered, it approaches the resonant frequency to increase the current volume I1. Accordingly, a current flowing to a secondary coil of a leakage transformer increases. Inversely, the higher the frequency becomes, the more distant the frequency value recedes from the resonant frequency, and the current flowing to the secondary coil of the leakage transformer becomes smaller. In the case of an inverter circuit operating a microwave oven which is a non-linear load, output is varied by changing the frequency. In a microwave oven using a non-linear load of a magnetron, in the case where the power supply to be inputted is an alternative current such as a commercial power supply, the switching frequency is varied.

In the case of high frequency output, frequency becomes the highest in the vicinity of 90 degrees and 270 degrees. For example, when a microwave oven is used at 200 W, the frequency is close to f3. When 500 W is used, the frequency becomes lower than f3, and when 1000 W is used, the frequency becomes still lower. As a matter of course, input power or input current is subject to control, and thus, due to variations of the commercial power voltage and magnetron temperature, frequency varies.

In the vicinity of 0 degree and 180 degrees of the power supply phase, in accordance with characteristics of a magnetron which does not oscillate high frequencies without application of a high voltage, by setting the frequency application close to f1 adjacent to the resonant frequency f0 in which the resonant current increases, the voltage rise ratio of the magnetron application voltage with regard to the commercial power voltage, setting the phase width of the commercial power supply causes the magnetron to generate electromagnetic waves to be wide.

FIG. 2 shows an example of a resonant type high frequency heating apparatus driven by switching elements consisting of a pair of bridges described in the reference patent document 1. In FIG. 2, the high frequency heating apparatus comprises a direct current power supply 1, a leakage transformer 2, a first semiconductor switching element 6, a first capacitor 4, a second capacitor 5, a third capacitor (smooth capacitor) 13, a second semiconductor switching element 7, a driving portion 8, a full-wave voltage multiplying rectification circuit 10, and a magnetron 11.

A direct current power supply 1 rectifies full waves of a commercial power supply and apply a direct current voltage VDC to a series circuit consisting of a second capacitor 5 and the primary coil 3 of the leakage transformer. The first semiconductor switching element 6 is connected in series to the second semiconductor switching element 7. An other series circuit consisting of the primary coil 3 of the leakage transformer 2 and the second capacitor 5 is connected in parallel to the second semiconductor switching element 7.

The first capacitor 4 is connected in parallel to the second semiconductor switching element 7. A high voltage output generated by a secondary coil 9 of the leakage transformer 2 is converted into a DC high voltage by the full-wave voltage multiplying rectification circuit 10, and then applied between an anode and a cathode of the magnetron 11. A third coil 12 of the leakage transformer 2 feeds a direct current to the cathode of the magnetron 11.

The first semiconductor switching element 6 is comprised of an insulated gate bipolar transistor (IGBT) and a fly-wheel diode connected to the IGBT in parallel. The second semiconductor switching element 7 also is comprised of an IGBT and a fly-wheel diode.

As a matter of course, the first and second semiconductor elements 6 and 7 are not always limited thereto, however, a thyristor or GTO switching elements may also be used.

The driving portion 8 having an oscillator for generating driving signals of the first and second semiconductor switching elements 6 and 7, generates a predetermined frequency signal and a duty signal, and provides a drive signal to the first semiconductor switching element 6.

The first and second semiconductor switching elements 6 and 7 are alternately driven, or are driven by a dead-time preparation means (to be described later) for a period that the first and second semiconductor switching elements 6 and 7 are simultaneously turned off, in turn, by providing a dead time.

The "dead time" will be described in detail later. Immediately after either of the first and second semiconductor switching elements 6 and 7 is turned OFF, the voltage at both ends of the other semiconductor switching element still remains high, and thus, if the other switching element is turned ON at this moment, a spike-like over-current flows to cause unwanted loss and noise is generated. The dead time causes the "turn-ON" operation to delay until the voltage at both ends of the switching element is reduced to approximately 0V, thereby preventing the loss and noise from occurring. As a matter of course, the same applies to the case of the inverse switching operation.

FIG. 3 shows respective operation modes of the circuit shown in FIG. 2. FIG. 4 shows a chart of voltage/current waveforms of various components including the first and second semiconductor switching elements 6 and 7 loaded in respective circuits. In FIG. 4, (a) in the operating mode 1, a drive signal is provided to the first semiconductor switching element 6. At this time, a current flows through the primary coil 3 and the second capacitor 5 from the direct current power supply 1.

(b) In the operating mode 2, after the first semiconductor switching element 6 is turned OFF, a current flowing through the primary coil 3 and the second capacitor 5 starts to flow towards the first capacitor 4. At the same time, a voltage of the first semiconductor switching element 6 rises.

(c) In the operating mode 3, a voltage of the first capacitor 4 shifts from VDC to 0V. In the mode 3, voltages at both ends of the first capacitor 4 reach 0V, thereby turning a diode consisting of the second switching element 70N.

(d) In the operating mode 4, due to resonant effects, the directions of the current flowing through the primary coil 3 and the second capacitor 5 are inverted, and thus, it is necessary at this moment that the second semiconductor switching element 7 has been turned ON. While operating modes 2, 3, and 4, the voltage of the first semiconductor switching element 6 becomes equal to the direct current power supply voltage VDC. In European countries where the effective voltage of the commercial power supply is 230V, the peak of the voltage corresponds to √2 times, and accordingly, the direct current power supply voltage VDC becomes approximately 325V.

(e) In the operating mode 5, the second semiconductor switching element 7 is turned OFF, thereby allowing the currents flowing through the second capacitor 5 and the primary coil 3 to start flowing towards the first capacitor 4 and the voltage in the first capacitor 5 rises to VDC.

(f) In the operating mode 6, the voltage in the first capacitor 4 rises to VDC, thus allowing a diode consisting of the first semiconductor switching element 6 to be turned ON. Due to resonant effects, the directions of the current flowing through the primary coil 3 and the second capacitor 6 are inverted and it is necessary at this moment that the first semiconductor switching element 6 has been turned ON. This condition becomes the operating mode 1. While the operating modes 6 and 1, the voltage of the second semiconductor switching element 7 becomes equal to the direct current power supply voltage VDC.

According to the above circuit structure, it is possible to specify the maximum value of the voltage applied to the first and second semiconductor switching elements 6 and 7 so as to be the direct current power supply voltage VDC.

The operating modes 2 and 5 respectively correspond to a resonant duration in which the current from the primary coil 3 flows through the first and second capacitors 4 and 5. The capacitance value of the first capacitor 4 is set to be less than one tenth the capacitance value of the second capacitor 5. Accordingly, synthetic capacitance substantially approximates the capacitance value of the first capacitor 4. The time constant determined by the synthetic capacitance and the impedance of the leakage transformer 3 varies the voltage applied to the first and second semiconductor switching elements 6 and 7 in the operating modes 3 and 5. By provision of a variation in the voltage with a slope determined by the time constant, it is possible to reduce the loss of the switching effect at the time of turn-off of the first semiconductor switching element 6 during the operating mode 3.

Further, the voltage becomes 0 during the operating mode 5, the application voltage of the first semiconductor switching element is 0 while the first semiconductor switching element is turned ON during the operating mode 1, thereby reducing loss of the switching during the ON period. This is referred to as "zero voltage switching," which characterizes the resonance circuit method to be advantageous by preventing the voltage in the above semiconductor switching elements from exceeding the direct current power supply voltage VDC. As shown in FIG. 4, the second capacitor 5 is set to a significant large capacitance so that the voltage therein contains less ripple.

Moreover, as shown in FIG. 2, an inverter circuit provided with an arm consisting of a pair of transistors in which a series connecting circuit comprising the semiconductor switching elements 6 and 7 to be connected in parallel to the direct current power supply 1 is provided, the semiconductor switching elements 6 and 7 alternately repeat ON/OFF operations, thereby allowing the primary coil 3 of the leakage transformer 2 to generate a high-frequency alternate current so as to induce a high-pressure high frequency to the secondary coil 9, however, it is absolutely required to prevent the semiconductor switching elements 6 and 7 from turning ON simultaneously even for a moment. Otherwise, this will cause the direct current power supply to short-circuit.

Herein, conventionally, a period ("deadtime," abbreviated as DT) for which neither the semiconductor switching elements 6 and 7 are turned ON from the moment at which either of the semiconductor switching elements 6 and 7 is turned OFF up to the moment at which the other switching element is turned ON, has been necessarily provided.

Referring to FIG. 4, the "dead time" is described below. FIG. 4 shows voltages and current waveforms of the first and second semiconductor switching elements 6 and 7 (shown in FIG. 2) and the first and second capacitors 4 and 5 in respective operating modes 1 through 6.

(a) denotes current waveforms of the first semiconductor switching element 6 in the respective operating modes 1 through 6, where the semiconductor switching element 6 which has been conducted since the t0 time point (accordingly, the voltage between the emitter and the collector of the semiconductor switching element 6 is 0 in the column (b)) is turned OFF (the current becomes 0) at the terminating t1 time point of the operating mode 1.

On the other hand, (d) denotes a voltage waveform of the second semiconductor switching element 7. This switching element 7 which has been turned OFF from the t0 time point remains OFF to t1 time point of the mode 3 at which an ON signal is applied.

Accordingly, during the period DT1 from the t1 time point to the t1 time point, the first and second semiconductor switching elements 6 and 7 respectively are turned OFF. The dead time DT1 is the minimum value required during the dead time. The maximum value is a period from the t1 time point to the t3 time point, and the dead time is allowable within this range.

Likewise, as shown in the column (c), the period DT2 from the moment at which the second semiconductor switching element 7 is turned OFF (the current becomes 0) at the t4 time point to t5 time point at which the operating mode 6 is started in which an ON signal is applied to the first semiconductor switching element 6 as shown in (a) is a minimum value required during the dead time. The maximum value corresponds to a period from the t4 time point to the t6 time point and the dead time is allowable within this range.

In a conventional inverter circuit comprising a pair of transistors, the dead time DT has been divided into a period DT1 and a period DT2 by computing a range for which turning ON and OFF operations of respective semiconductor switching elements 6 and 7 are not overlapped, and the values of the DT1 and the DT2 have been fixed.

In the case of an inverter circuit loaded in a microwave oven, as will be described later, the duration from a moment at which either of the semiconductor switching elements is turned off to a moment at which a voltage Vce between the emitter and the collector of the other semiconductor switching element is reduced to 0 becomes long. Accordingly, after the former semiconductor switching element is turned OFF, and a predetermined dead time has elapsed, when a turn-ON signal is applied to the latter semiconductor switching element, the former semiconductor switching element is turned ON before the voltage Vce between the emitter and the collector is reduced to zero. It was found that, if the switching frequency is high, thermal loss occurs in the semiconductor switching element. More particularly, even when the semiconductor switching element is turned OFF, as long as the frequency is driven in a high range, the time constant is extended and a turn-ON signal is applied before the voltage Vce between the emitter and the collector of the semiconductor switching element is reduced to zero, therefore, a thermal loss occurs and a spike current is generated, resulting in a noise generation source.

Referring again to FIG. 4, the reason for which a thermal loss and noise are generated is described below.

In (a), even when the semiconductor switching element 6 has turned OFF at the t1 time point (current has been reduced to zero), a time from t1 time point to t2 time point is required for which the voltage (shown by a solid line) at both ends of the other semiconductor switching element 7 is reduced to zero. Accordingly, when a turn-ON signal is applied to the other semiconductor switching element 7 at the t1 time point, a voltage between the emitter and the collector of the semiconductor switching element 7 is reduced to zero, the semiconductor switching element 7 is turned ON via the voltage (to be conducted) (this is referred to as "zero-volt switching"), and thus, no problems such as a thermal loss and noise are generated.

Nevertheless, trapezoidal slope of the waveform VDC varies by the intensity of resonance. If the resonance is intensified (i.e., frequency is low), the slope is steep to cause the voltage at both ends of the semiconductor switching element 7 to be zero faster. Conversely, if the resonance is weak (i.e., when the frequency level becomes higher), the slope becomes gradual, thereby requiring much time before the voltage is reduced to zero. Thus, while the frequency is driven at a high range, the frequency itself is apart from the resonant frequency resulting in the extended time constant. As a result, in (d), it takes a longer time before the voltage (shown by dotted lines) at both ends of the other semiconductor switching element 7 is reduced to zero. The voltage can hardly be reduced to zero during a period t1-t2, however, instead, even after the t1 time point has elapsed, a predetermined voltage (refer to Vt2 of the dotted line F) was still applied thereto.

Accordingly, as conventional, when an ON signal is applied to the semiconductor switching element 7 at the t1 time point, as the semiconductor switching element 7 is turned ON in a state where a predetermined voltage Vt2 was applied between the emitter and the collector of this switching element 7, a thermal loss was generated. In addition, a steep spike current flows as a result of the generation of a large dv/dt, thereby causing a noise generation source.

Even after executing a hard switching operation (switching operation is compulsorily executed even when voltage or current is not zero), a dead time is still secured, which does not lead to a short-circuit accident, and an excessive thermal loss is merely generated in the insulated gate bipolar transistors. However, the thermal loss is cooled off via a heat sink, and so, even when a thermal loss has been generated, the inverter continues properly to operate. In addition, noise generated via a spike was negligible without raising a critical problem. Thus, in the conventional inverter circuit, adverse effects of hard switching has been disregarded.

The present invention is characterized by art for solving the above-referred problems thus far disregarded. Excessive thermal loss generated in the semiconductor switching elements means that energy has been wastefully consumed therein, thus, this is by no means desirable in light of saving energy. Further, an excessive thermal loss affects the service life of semiconductor switching elements, and yet, in light of the recent tendency in which a finer signal is used for driving recently developed ICs and CPUs, generation of noise will become a critical problem from now on. Thus, the present invention has been achieved to solve the above problems.

DISCLOSURE OF INVENTION

Accordingly, the object of the present invention is to provide an inverter circuit, in which a thermal loss is not easily generated in semiconductor switching elements, thus enabling to prevent energy from wastefully being consumed and prevent noise from being generated so as to further prevent the service life of semiconductor switching elements from adversely being affected.

To fully solve the above problems, the high frequency heating apparatus of the present invention is a high frequency heating apparatus for driving a magnetron comprising; a direct current power supply; a series circuit consisting of a pair of semiconductor switching elements; and a resonance circuit connected with a primary coil of a leakage transformer and a capacitor; wherein the series circuit is connected in parallel to the direct current power supply; an end of the resonance circuit in an AC equivalent circuit is connected to the intermediate point of the series circuit and the other end thereof is connected to an end of the direct current power supply; and the high frequency heating apparatus further comprising; a drive means for driving respective semiconductor switching elements; a rectifying means, which is connected to a secondary coil of the leakage transformer; and a magnetron connected to the rectifying means, wherein a variable dead time preparation circuit is provided which enables a period for which the respective semiconductor switching elements are simultaneously turned off to vary according to the switching frequency.

The high frequency heating apparatus of the present invention is a high frequency heating apparatus for driving a magnetron comprising; a direct current power supply; two sets of series circuits each consisting of a pair of semiconductor switching elements; and a resonance circuit connected with a primary coil of a leakage transformer and a capacitor; wherein the two sets of series circuits are respectively connected in parallel to the direct current power supply; an end of the resonance circuit is connected to the intermediate point of the series circuit and the other end thereof is connected to the intermediate point of the series circuit; and the high frequency heating apparatus further comprising; a drive means for driving respective semiconductor switching elements; a rectifying means, which is connected to a secondary coil of the leakage transformer; and a magnetron connected to the rectifying means, wherein a variable dead time preparation circuit is provided which enables a period for which the respective semiconductor switching elements are simultaneously turned off to vary according to the switching frequency.

The high frequency heating apparatus of the present invention is a high frequency heating apparatus for driving a magnetron comprising; a direct current power supply; a series circuit consisting of a pair of semiconductor switching elements; and a resonance circuit connected with a primary coil of a leakage transformer and a capacitor; wherein the series circuit is connected in parallel to the direct current power supply; the resonance circuit is connected in parallel to either of the semiconductor switching elements; and the high frequency heating apparatus further comprising; a drive means for driving respective semiconductor switching elements; a rectifying means, which is connected to a secondary coil of the leakage transformer; and a magnetron connected to the rectifying means, wherein a variable dead time preparation circuit is provided which enables a period for which the respective semiconductor switching elements are simultaneously turned off to vary according to the switching frequency.

Preferably, the variable dead time preparation circuit allows the dead time to increase in response to a rise in the switching frequency.

Preferably, the variable dead time preparation circuit allows the dead time to remain constant or to increase minutely below a predetermined switching frequency.

Preferably, the variable dead time preparation circuit allows the dead time to increase sharply at a predetermined switching frequency or more.

Preferably, the constant value or the minutely increased value of the dead time is variable below a predetermined switching frequency.

Preferably, the sharply increased value of the dead time is variable above a predetermined switching frequency.

Preferably, the predetermined switching frequency value is variable.

Further, the variable dead time preparation circuit allows the dead time to increase stepwise in response to a rise in the switching frequency.

Further, the variable dead time preparation circuit prepares dead time based on respective plus and minus offset voltages which vary by first slope in proportion to an increase in a switching frequency and further vary from a predetermined switching frequency by a second slope.

Further, the variable dead time preparation circuit is comprised of a VCC power supply, a duty controlled power supply, a first current which varies in proportion to a switching frequency, a second current which flows from a predetermined frequency and varies in proportion to the switching frequency, a third current which is obtained by synthesizing the first and second currents and multiplying the result by a predetermined coefficient, and an upper and lower potential preparation means for preparing upper and lower potentials which are obtained by adding plus and minus offset potentials in proportion to the third current to the duty controlled power supply, wherein a dead time is prepared based on the upper and lower potentials.

Further, at least either of the duty controlled power supply voltage or the switching frequency is allowed to vary so as to control input power or input current.

According to the present invention, the high frequency heating apparatus for driving a magnetron, comprising a frequency-controlled type resonance inverter circuit having at least an arm including semiconductor switching elements; the high frequency heating apparatus further comprises a variable dead time preparation circuit, which allows a period for which the respective semiconductor switching elements are simultaneously turned off to vary in response to the switching frequency; wherein, the variable dead time preparation circuit prepares a dead time based on the plus and minus offset voltages which vary by the first slope in proportion to an increase in the switching frequency and further vary from a predetermined switching frequency by the second slope.

By adopting the above construction, it is possible to secure an inverter circuit, which rarely causes the insulated gate bipolar transistors to incur thermal loss and prevent energy from wastefully being consumed, and further, rarely incurs noise generation.

BRIEF DESCRIPTION OF DRAWINGS

FIG. 6 are explanatory views of the principle for preparing a dead time; wherein FIG. 6(a) is an explanatory view of the relationship between the output voltages of the oscillation circuit and the variable dead time preparation circuit and the output voltage of the rectangular waveform forming circuit; FIG. 6(b) is an explanatory view of the principle that the dead time DT remains invariable even when frequency varies within a range in which a low frequency is present;

FIG. 9 are views showing frequency characteristics with respect to dead time according to the present invention; wherein FIG. 9(a) shows an example of causing the dead time DT to remain constant or to increase minutely at below frequency f1 and further causing the dead time DT to increase sharply at a point above a predetermined switching frequency f1; FIG. 9(b) are modified examples, in which (A) is an example of causing constant values or sharply increased values of the dead times to be varied upward or downward; (B) is an example of varying slopes at the frequency f1; and (C) is an example of causing frequencies to be variably shifted to the left and to the right at the inflection points;

BEST MODE FOR CARRYING OUT THE INVENTION

Figure 5:
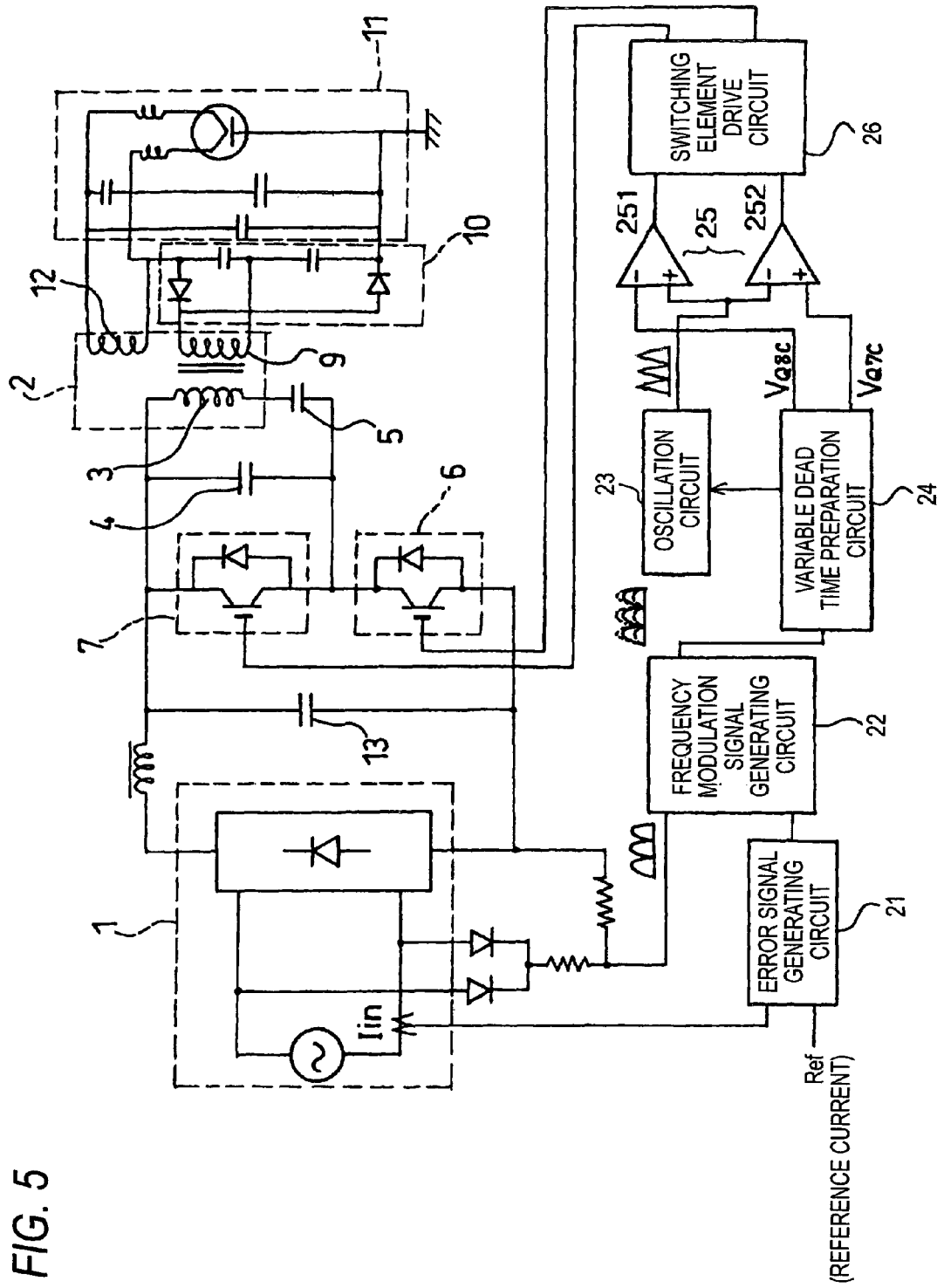
FIG. 5 is a diagram of the high frequency heating apparatus driven by the bi-transistor bridged circuit according to the present invention.

FIG. 5 shows a high frequency heating apparatus driven by a pair of bridged transistors according to the present invention.

Figure 2:
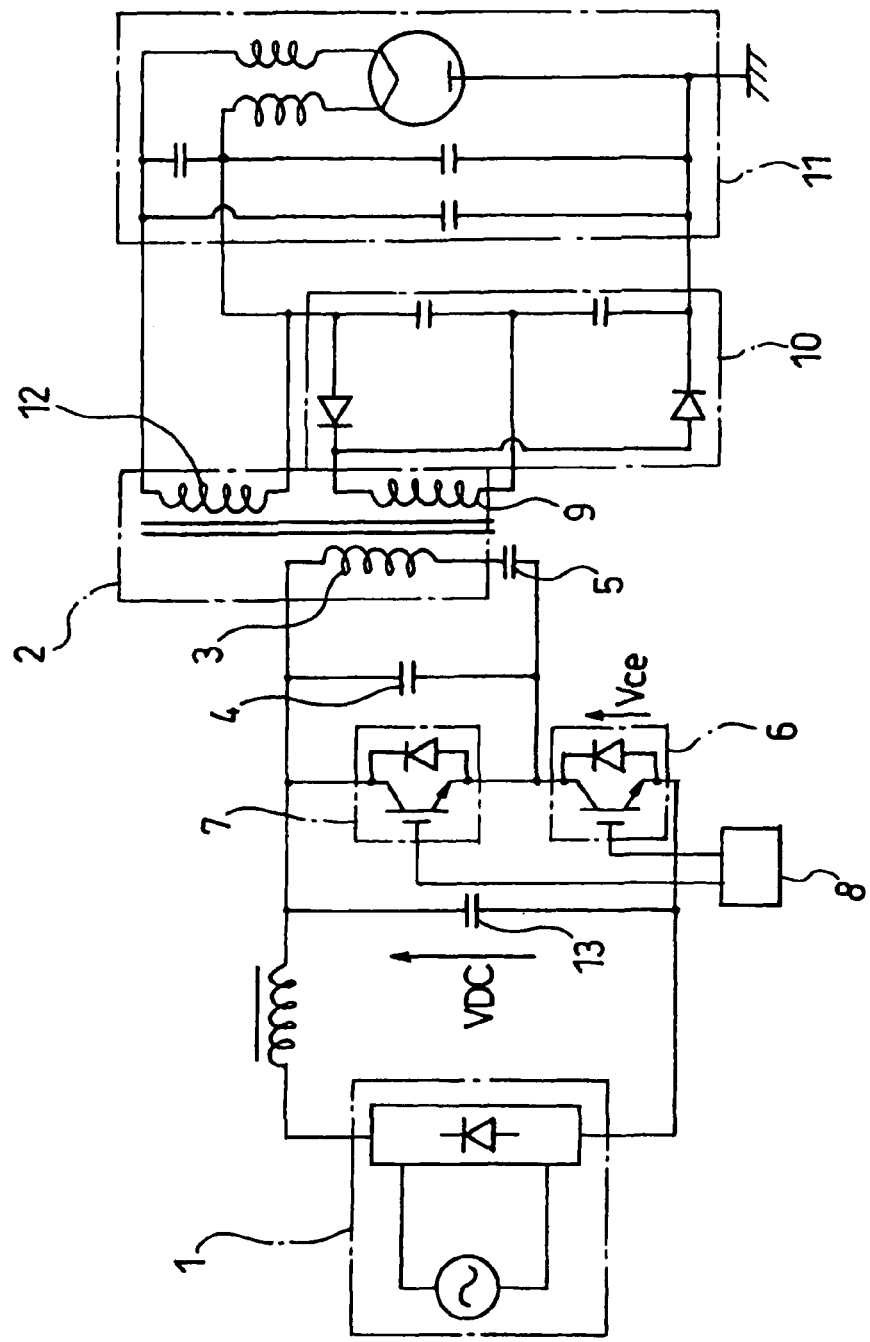
FIG. 2 is an example of a resonance type high frequency heating apparatus driven by switching elements based on a bi-transistor bridged circuit structure described in the above-cited reference patent document 1.
Figure 3:
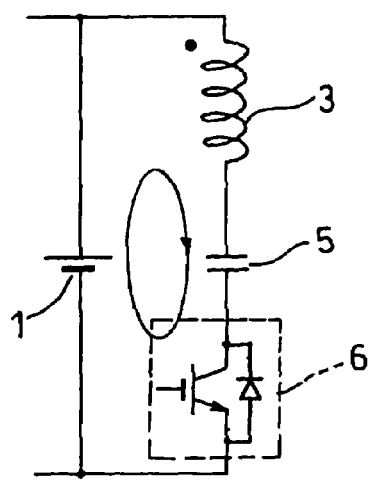
FIG. 3 show respective modes for operating the circuit shown in FIG. 2.
Figure 3:
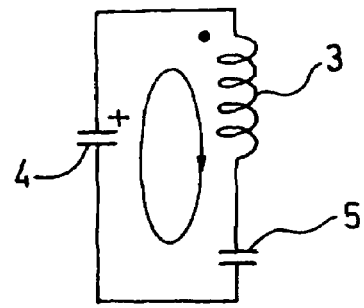
Figure 3:
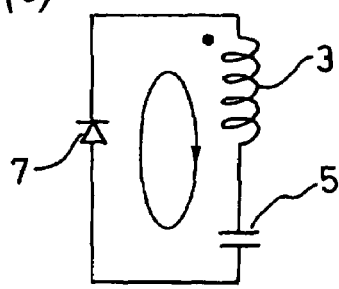
Figure 3:
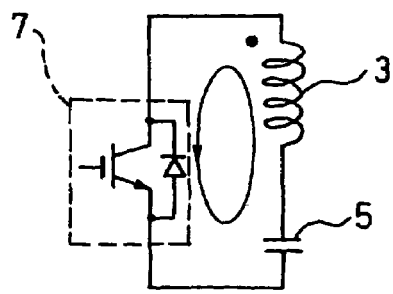
Figure 3:
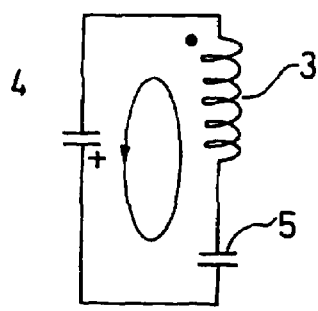
Figure 3:
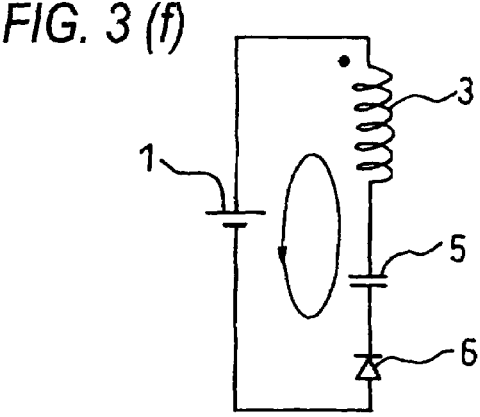
Figure 4:
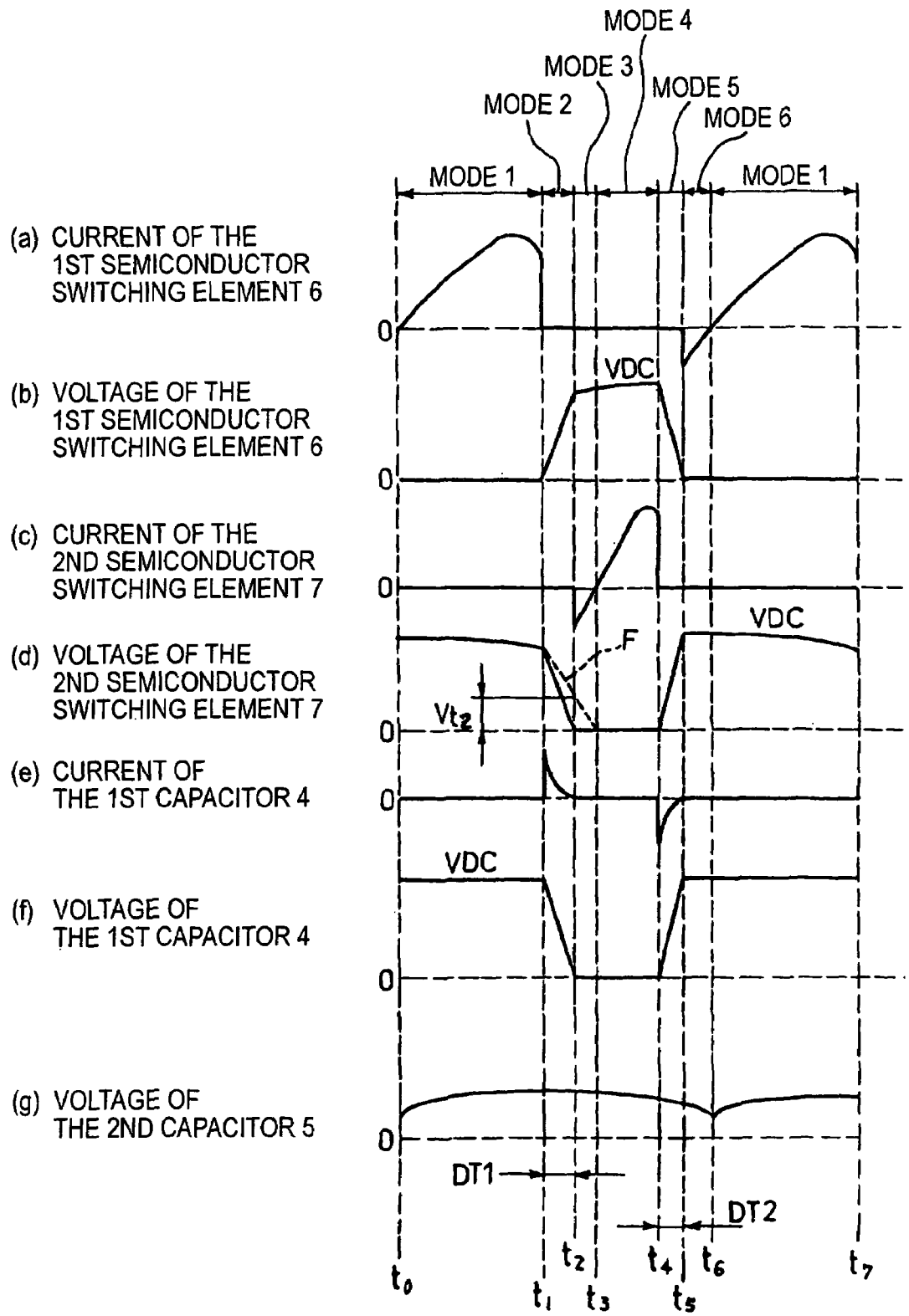
FIG. 4 is a line chart showing voltage and current waveforms generated in the semiconductor switching elements.

In the high frequency heating apparatus shown in FIG. 5, its main circuit is comprised of a direct current power supply 1, a leakage transformer 2, a first semiconductor switching element 6, a first capacitor 4, a second capacitor 5, a third capacitor (smoothing capacitor) 13, a second semiconductor switching element 7, a driver 8, a full-wave voltage multiplying rectification circuit 10, and a magnetron 11. The main circuit constitution is identical to that shown in FIG. 2, and thus, overlapping description thereof is omitted.

A controlling circuit for controlling the semiconductor switching elements 6 and 7 is comprised of an error signal generating circuit 21 for seeking the difference between an input current Iin and the reference current Ref; a frequency modulating signal generating circuit 22 for generating a frequency modulating signal from the error signal generating circuit 21 and AC full-wave signal; an oscillation circuit 23 for generating a triangular carrier wave from the frequency modulating circuit 22; a variable dead time preparation circuit 24, which has been realized by the present invention so as to vary dead time according to the magnitude of switching frequency; a rectangular waveform forming circuit 25 for forming respective rectangular waveforms from the triangular waveforms output from the oscillation circuit 23 and the respective output signals from VQ7C and VQ8C of the variable dead time preparation circuit 24; and a switching element drive circuit 26, which generates pulse signals for enabling the switching elements to be turned ON and OFF via an output signal from the rectangular waveform forming circuit 25. The output from the switching element drive circuit 26 are provided to the gates of the switching elements 6 and 7 (IGBT).

Collector voltages of the transistors Q7 and Q8 are transmitted to the rectangular waveform forming circuit 25 via the variable dead time preparation circuit 24 (refer to FIG. 5). Likewise, triangular waveform output from the oscillation circuit 23 is also transmitted to the rectangular waveform forming circuit 25.

The rectangular waveform forming circuit 25 is provided with a pair of comparators 251 and 252. A collector voltage VQ8C of the above transistor Q8 is transmitted to an inverted input terminal (−) of the comparator 251, the other collector voltage VQ7C of the transistor Q7 is transmitted to a non-inverted input terminal (+) of the comparator 252, and a triangular waveform output from the oscillation circuit 23 is transmitted to the non-inverted input terminal (+) of the comparator 251 and also to the inverted input terminal (−) of the other comparator 252.

When the potential of the non-inverted input terminal (+) is lower than that of the inverted input terminal (−), both comparators 251 and 252 do not output (potential 0). When the potential of the non-inverted input terminal (+) exceeds the potential of the inverted input terminal (−), both comparators 251 and 252 deliver output (potential high).

FIG. 6 shows a chart for explaining the principle of preparing a dead time, in which chart (a) is a view for explaining the relationship of those respective outputs from the oscillation circuit 23 and the variable dead time preparation circuit 24 and the output from the rectangular waveform forming circuit 25. FIG. 5 (b) is a view for explaining the principle in which the dead time DT remains constant even when the frequency has been varied within a low range.

In FIG. 6, prior to the t1 time point, the potential VQ7C of the non-inverted input terminal (+) of the comparator 252 exceeds the potential of the triangular waveform of the inverted input terminal (−) as shown in FIG. 5, thereby allowing the semiconductor switching elements to be turned ON (output 1). Concurrently, potential of triangular waveform at the non-inverted input terminal (+) of the comparator 251 is lower than the potential VQ8C of the inverted input terminal (−), the semiconductor switching elements are turned OFF (output 0).

[1] At the t1 time point, the potential VQ7C of the non-inverted input terminal (+) of the comparator 252 becomes lower than the potential of triangular waveform at the inverted input terminal (−), thereby the output becomes 0.

[2] At t1 through t4, the comparator 252 continuously outputs 0.

[3] At the t2 time point, potential of the triangular waveform at the non-inverted input terminal (+) of the comparator 251 becomes higher than the potential VQ8C at the inverted input terminal (−), thereby output 1 is available.

[4] At the t1 through t3, the comparator 251 continuously outputs 1.

[5] At the t3 time point, potential of the triangular waveform at the non-inverted input terminal (+) becomes lower than the potential VQ8C at the inverted input terminal (−), thereby the output becomes 0.

[6] At the t4 time point, the potential VQ7C of the non-inverted input terminal (+) of the comparator 252 becomes higher than the potential of the triangular waveform at the inverted input terminal (−), thereby the output becomes 1.

[7] At t4 through t5, the comparator 252 continuously outputs 1.

[8] At the t5 time point, the potential VQ7C at the non-inverted input terminal (+) of the comparator 252 becomes lower than that of the triangular waveform at the inverted input terminal (−), and so, the output becomes 0.

[9] At t3 through t6, the comparator 251 continuously outputs 0.

Hereinafter, the same serial steps described above will be repeated.

Outputs from the comparators 251 and 252 are then provided to the switching element (IGBT) drive circuit 26 so as to allow the switching elements to be turned ON and OFF based on the identical timing. In this way, during a period t1~t2 for which the switching elements 6 and 7 are simultaneously turned OFF, the periods t3~t4, and t5~t6, are secured as the dead time.

Conventionally, duration of the dead time DT was fixed irrespective of frequencies. However, the present invention is characterized in that the dead time is set to be a predetermined constant value (or a minutely increased value) when the frequency is smaller than the predetermined switching frequency f1, and the dead time DT is increased when the frequency is larger than the predetermined switching frequency f1.

Referring now to FIG. 6 (b), the principle for which the dead time DT becomes a predetermined constant value when the frequency is lower than the predetermined switching frequency f1 will be described below.

Referring to FIG. 6 (b), when the frequency is high as shown by a solid line, as described earlier by referring to the VQ8C and VQ7C and the triangular waveforms shown by solid lines, in terms of the relationship between the VQ8C and VQ7C and the triangular waveform, a period between the t1 time point when the potential VQ7C becomes lower than the potential of the triangular waveform, no output is generated and the t1 time point at which the potential of the triangular waveform becomes higher than the potential VQ8C so as to generate an output 1 is secured as a dead time DT.

When the frequency lowers, a triangular waveform shown by a dotted line is formed, where the slope becomes gradual. In the present invention, in order to secure an identical dead time DT, offset voltages are respectively determined so that the potentials VQ7C and VQ8C pass through the intersections C1 and C2 at the perpendicular line drawn towards the triangular waveform shown by a dotted line from the t1 time point and t1 time point. As electrical resistances R7 and R8 are of the constant resistance value, the current I7 and I8 to be converted into offset voltages are respectively transmitted to the resistors R7 and R8.

Due to the above arrangement, even if the frequency varies to cause the triangular waveform to be varied into a form shown by a dotted line from the other form shown by a solid line, as t1 time point and t1 time point at which the triangular waveform shown by a dotted line transverses a pair of potentials VQ7C and VQ8C are the same, the dead time DT1 is the same.

Figure 7:
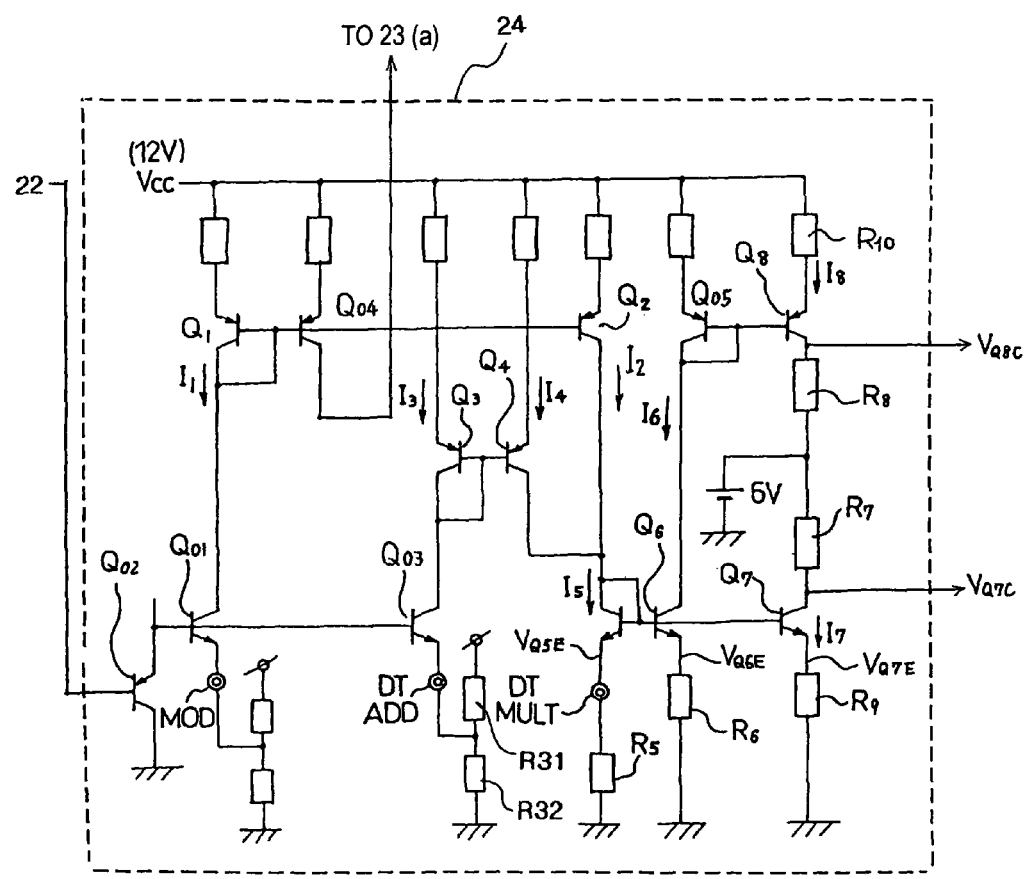
FIG. 7 is a concrete example of the variable dead time preparation circuit according to the present invention.

FIG. 7 is a concrete example of the variable dead time preparation circuit according to the present invention.

In FIG. 7, reference numerals Q01, Q02, and Q1 through Q8 respectively denote transistors, whereas R1 through R10 respectively denote resistors. Currents respectively flowing through Q1, Q3, Q4, Q5, Q6, Q7, and Q8 are referred to as I1, I3, I4, I5, I6, I7, and I8, the emitter potentials of the transistors Q5, Q6 and Q7 are referred to as VQ5E, VQ6E, and VQ7E, and collector potentials of the transistors Q7 and Q8 are respectively referred to as VQ7C and VQ8C. The transistors Q1 and Q2 jointly constitute a current mirror circuit. Likewise, the transistors Q1 and Q04, the transistors Q3 and Q4, and the transistors Q05 and Q8, respectively constitute an independent current mirror circuit. Current output from the transistor Q04 is provided to the oscillation circuit 23 (refer to FIG. 11).

The emitters of the transistors Q1 and Q3 are respectively connected to Vcc, whereas the collectors thereof are respectively connected to the collectors of the transistors Q01 and Q03. The emitters of the transistors Q01 and Q03 are respectively connected to terminals MOD and DTADD. The terminal MOD and the terminal DTADD are respectively grounded via potential dividers. The bases of the transistors Q01 and Q03 are connected to the emitter of the transistor Q02, whereas the collector of the transistor Q02 is grounded. An oscillated frequency controlled voltage which is output from the frequency modulating signal generating circuit 22 (FIG. 5) is applied to the base of the transistor Q02.

Between the 12V Vcc and the grounding, from the Vcc side, a series connected circuit consisting of resistors R10, R8, R7, and R9 is formed, and further, between the resistors R10 and R8, the emitter of the transistor Q8 is connected to the resistor R10 and the collector thereof is connected to the resistor R7. Further, between the resistors R7 and R9, a ½Vcc is applied. Centering the 6V, lowering in the voltage of the upper resistor R8 is I8×R8, whereas lowering in the voltage of the lower resistor R7 is I7×R7. The current I8 and I7 are variable depending on frequencies. Due to the above arrangement, the declined amount of voltage of the resistors R7 and R8 is varied by frequencies. As a result, centering the 6V, the offset voltages VQ7C and the VQ8C vary.

The base voltage of the transistor Q05 consisting of a current mirror circuit is applied to the base of the transistor Q8. If the characteristics of the transistors Q05 and Q8 are equal, and the resistance values thereof are also equal, I6=I7=I8 and I3=I4 are obtained. However, the above relationship is not limited to I1=I2, I3=I4, and I6=(I7=I8), however, these may be in proportional relationship.

Note that the relationship I7=I8 is necessary.

Next, operation of the variable dead time preparation circuit (more particularly, if the frequency is less than a predetermined switching frequency, a dead time DT is set to be constant (or minutely increased), if the frequency is more than a predetermined switching frequency, the dead time DT is increased) is described below.

The reason why the dead time DT becomes constant or minutely increased in a range where a current I3 does not flow (i.e., in a range where an oscillated frequency is low) is described below. Concretely, in a range where no current I3 flows, I1=I2=I5 is obtained. This condition also corresponds to a relationship VQ5E=VQ6E=VQ7E, and further corresponds to a relationship expressed as I5×R5=I6×R6=I7=×R9=I1=R5.

Currents I8 and I7 flowing through the transistors Q8 and Q7 respectively correspond to a relationship expressed as follows:

$$I8=I6=I1\times=I1\times(R5/R9)$$

$$I7=I1\times(R5/R9)$$

Offset voltages VR8 and VR7 respectively correspond to a relationship expressed as follows:

$$VR8=I8\times R8=\{I1\times(R5/R6)\}\times R8=I1\times R5\times(R8/R6)$$

$$VR7=I1\times R5\times(R7/R9)$$

VQ8C and VQ7C are obtained by adding the above offset voltages to the above 6V or subtracting the above offset voltages from 6V, and thus, the following equations are formulated.

$$VQ8C=6V+VR8=6V+I1\times R5\times(R8/R6)$$

$$VQ7C=6V-VR7=6V-I1\times R5\times(R7/R9) \quad (1)$$

As described above, the current I8 and I7 within a range of low frequency (where the dead time may be constant) is in a proportional relationship with the charged and discharged current I1 of the triangular waveform, and thus, it is possible to use a value that is obtained by multiplying the charged/discharged current of the triangular waveform by a plurality of times. This can be realized by applying the mirror circuit as shown in FIG. 7. Concretely, currents I6 and I18 are held under a predetermined relationship with regard to the current I5 so that the current I6 is set to be equal to the current I8. By holding the current I7 under a predetermined relationship with regard to the current I5, so that the current I7 and the current I8 are set to be equal.

Figure 8:
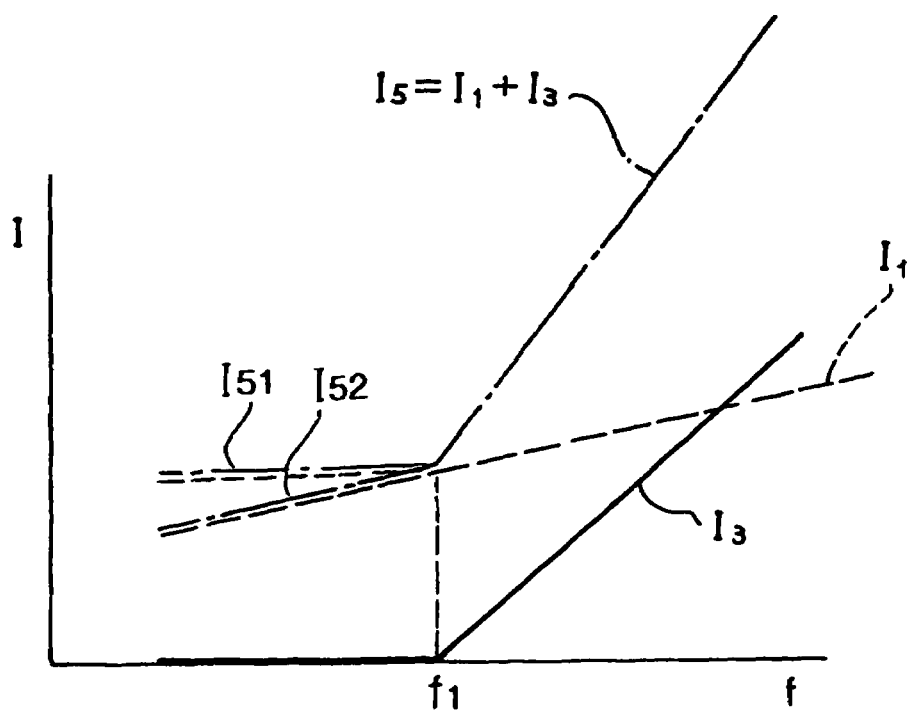
FIG. 8 shows frequency characteristics with respect to current which the variable dead time preparation circuit has.

FIG. 8 shows frequency characteristics with regard to current held by the variable dead time preparation circuit according to the present invention. In FIG. 8, reference numerals I1, I3 and I5, respectively denote currents flowing through the transistors Q1, Q3, and Q5 shown in FIG. 7. The current I5 corresponds to I1+I3.

In a low frequency range below f1, the current I1 (I5) is constant (I51) or minutely being increased (I52). In a high frequency range above f1, the current I3 suddenly starts to flow across an inflection point corresponding to the frequency f1, and thus, the current I5 being the sum of the current I3 and I1 sharply increases.

It is understood from the above equation (1) relevant to the VQ8C and VQ7C and also from FIG. 8 that, in a range where the oscillated frequency is low, an offset voltage in proportion to the charged current I1 of the capacitor of the oscillated circuit can be obtained for Q8C and VQ7C, therefore, if the charged/discharged current I1 were constant as shown in FIG. 8, the dead time becomes constant. If the charged/discharged current I1 minutely increases, the dead time also increases minutely.

Contrary to the above case, the dead time DT is variable in a range in which the current I3 flows (i.e., in a range in which oscillated frequencies are high). This reason is described below.

In FIG. 7, the current I3=0 within a range in which oscillated frequencies are low. However, within a range in which oscillated frequencies are high, the current I3 is arranged to flow itself as follows. Concretely, when the emitter potential of the transistor Q02 corresponding to the oscillated frequency controlled voltage is lower than the potential at the contact point DTADD, the transistor Q03 connected to the terminal DTADD is not turned ON (thereby the current I3 does not flow.) Conversely, when the emitter potential of the transistor Q02 corresponding to the oscillated frequency controlled voltage is higher than the potential at the terminal DTADD, the transistor Q03 connected to the terminal DTADD is turned ON, thus enabling the current I3 to flow itself. In FIG. 8, the current I51 is constant or the current I52 is minutely increased in a range in which an oscillated frequency is lower than f1. On the other hand, in a range in which an oscillated frequency is higher than f1, the current I3 suddenly starts to flow itself from zero. Accordingly, the equation of I5=I1+I3 is obtained. In a range in which the current I3 flows, the following equations are formulated:

$$I5 = I2 + I4 = I1 + I3$$

$$I5 \times R5 = I6 \times R6 = I7 \times R9 = (I1+I3) \times R5$$

Accordingly, the collector voltage of the transistors Q8 and Q7 is obtained by the equation (2) below.

$$VQ8C = 6V + VR8 = 6V + (I1+I3) \times R5 \times (R8/R6)$$

$$VQ7C = 6V - VR7 = 6V - (I1+I3) \times R5 \times (R7/R9) \quad (2)$$

In the case of the circuit shown in (a), as a result of setting the capacitance of the first capacitor 41 and the second capacitor 42, an identical effect can also be secured even in a circuit without a third capacitor 5.

By referring to the above equation (2) pertaining to the potentials VQ8C and VQ7C and FIG. 8, it is understood that the potentials VQ8C and VQ7C obtain an offset voltage in proportion to the current I3. As shown in FIG. 8, when the current I3 sharply increases, the current I5 is increased, in response thereto, the collector voltage VQ8C and VQ7C are increased, since the collector potentials VQ8C and VQ7C of the transistors Q8 and Q7 respectively constitute a function of the current I5 (=I1+I3). When the respective collector potentials VQ8C and VQ7C are increased, the collector potential VQ8C rises higher than the illustrated position in FIG. 6, whereas the other potential VQ7C falls below the illustrated position. Accordingly, intersection between the triangular waveform designating the initiating point of the dead time DT and the potential VQ7C becomes faster, whereas the intersection between the other triangular waveform designating the terminating point of the dead time DT and the potential VQ8C delays. Consequently, the dead time DT increases beyond the width shown in FIG. 6.

Figure 9:
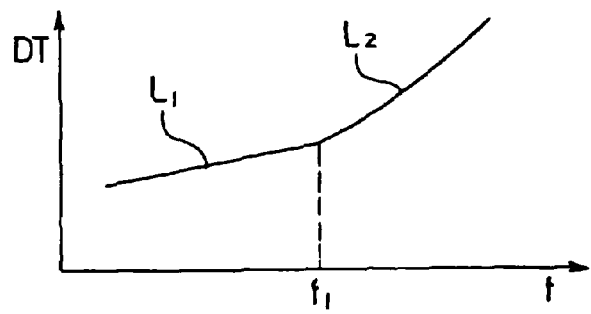
Figure 9:
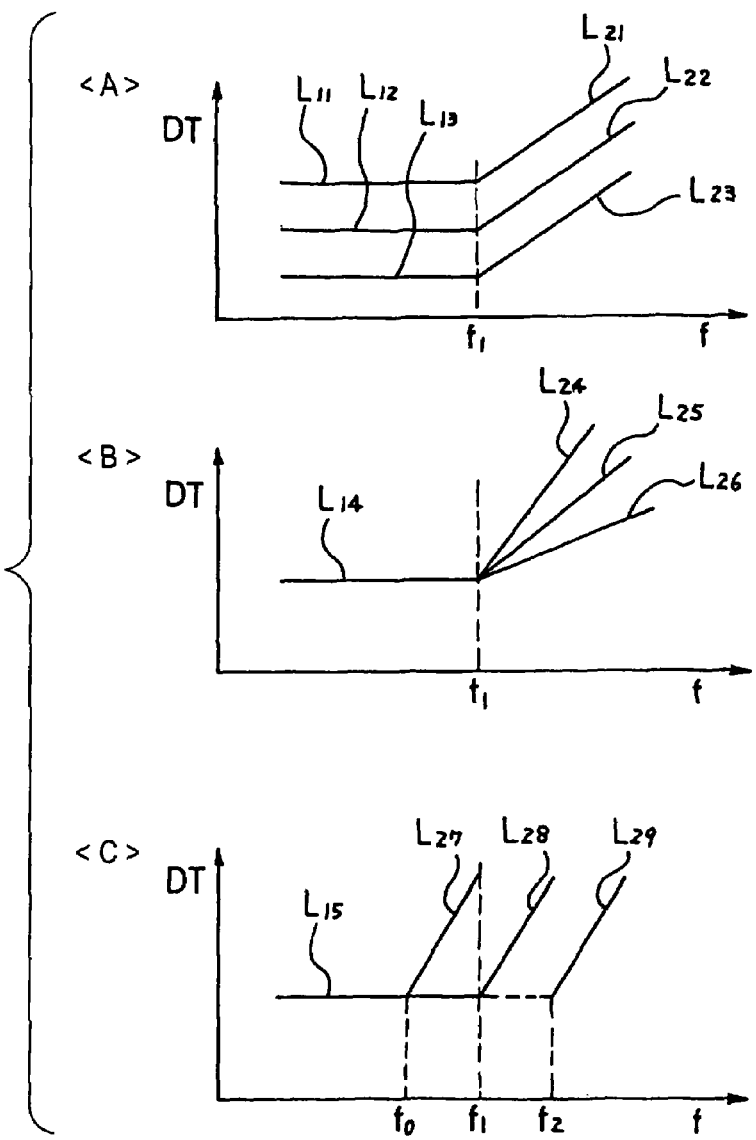

As described above, according to the present invention, as shown in FIG. 9(a), it is characterized in that the dead time DT is set to be constant (or to increase minutely) at a predetermined switching frequency f1 or below and sharply increased at a predetermined switching frequency f1 or above.

FIG. 9(b) is a modified example of FIG. 9(a).

In the diagram <A> of FIG. 9(b), a constant value or a minutely increased value L1 of the dead time is set to be variable such as L11, L12, and L13 below the predetermined switching frequency f1, whereas a sharply increased value L1 of the dead time DT is set to be variable such as L21, L22, and L23 above the predetermined switching frequency f1, for example.

This can be achieved by varying the ratio of the resistors R5 and R6 at the terminal DTMULTI shown in FIG. 7. Concretely, the ratio is expressed as I5×R5=I6×R6. Accordingly, when varying the ratio between R5 and R6, the ratio between I5 and I6 also varies. I6 determines the values of the I7 and I8, and thus, when varying the ratio between I5 and I6, values of I7 and I8 against I5 also vary. Consequently, an offset voltage from 6V also varies, thereby varying the dead time DT. This allows the dead time DT to vary even when the frequencies are identical.

In the diagram <B> shown of FIG. 9(b), the dead time slope at a predetermined switching frequency f1 is set to be variable such as L24, L25, and L26.

The dead time slope is determined by synthetic resistance values of resistors R31 and R32 disposed above and below the contact point DTADD. If the substantial synthetic resistance values are large, little current flows out from Vcc, thus reducing the slope (L26). Conversely, if the synthetic resistance values are small, a large volume of current flows out from Vcc, thus steepening the slope (L24). Concretely, when a large volume of the current I3 flows, flowing volume of the current I7 and I8 also increases to cause the voltage in the resistors R7 and R8 to decline noticeably and offset voltage from 6V is increased. Consequently, the above collector voltage in the transistors Q8 and Q7 increases as per the equation (2) cited above.

Note that, when the oscillated frequency rises, this in turn operates so as to contract the dead time DT, however, rise of the offset voltage operates so as to extend the dead time DT beyond the expected contraction range thereof.

In the diagram <C> of FIG. 9(b), a predetermined switching frequency f1 corresponding to an inflection point of FIG. 9(a) is set to be variable such as f0 and f2.

This inflection point can be varied by the resistance ratio of the resistors R31 and R32 disposed above and below the terminal DTADD. Concretely, the current I3 starts to flow when the oscillated frequency controlled voltage applied to the base of the transistor q02 exceeds a voltage determined by the resistance ratio, and thus, the resistance ratio of the resistors R31 and R32 becomes the inflection point. If the resistance value of the resistor R31 is greater than that of the resistor R32, as the voltage determined by the resistance ratio remains low, the current I3 starts to flow earlier. When the current I3 flows, the current I7 and I8 also flow, thus voltages in the resistors R7 and R8 are decreased, thereby allowing the offset voltage from 6V to increase. Consequently, the collector voltage in the transistors Q8 and Q7 is increased according to the above equation (2), and thus, the dead time DT starts to increase earlier (f0). Conversely, if the resistance value of the resistor R32 were greater than that of the resistor R31, as the voltage determined by the resistance ratio is high, it takes a certain time before the current I3 starts to flow, thereby causing the dead time DT to increase at a delayed time (f2).

Figure 10:
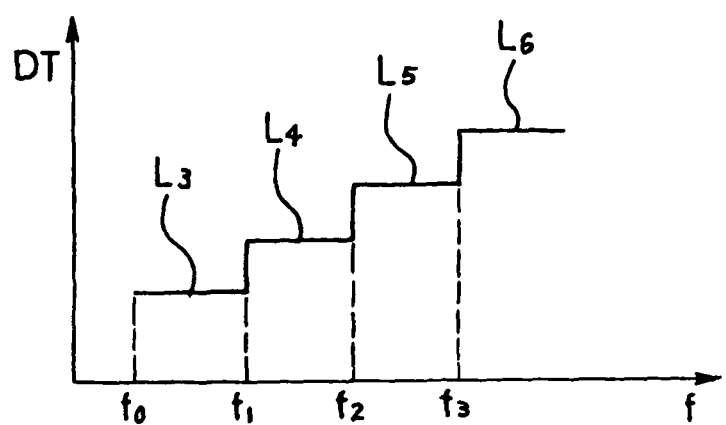
FIG. 10 is the second embodiment for causing the dead time DT to become variable.

FIG. 10 is a second embodiment of the variable dead time DT. In FIG. 9(a), centering the predetermined switching frequency f1 serving as an inflection point, the dead time DT is constant or minutely increased as denoted by L1 in a range below the switching frequency f1, whereas the dead time sharply is increased in a range beyond the switching frequency f1 as denoted by L2. On the other hand, in FIG. 10, in response to the stepwise rise of the switching frequency in order of f0, f1, f2, and f3, the dead time DT is set to increase stepwise in order of L3, L4, L5, and L6.

The stepwise structure can be realized by adopting procedures for preparing the dead times L11, L12, and L13 described by referring to the diagram <A> of FIG. 9(b). Concretely, by consisting of the resistors R5 and R6 of the terminal DTMULTI shown in FIG. 7 with variable resistance elements like transistors, the resistance ratio will be varied by applying a predetermined frequency.

Figure 11:
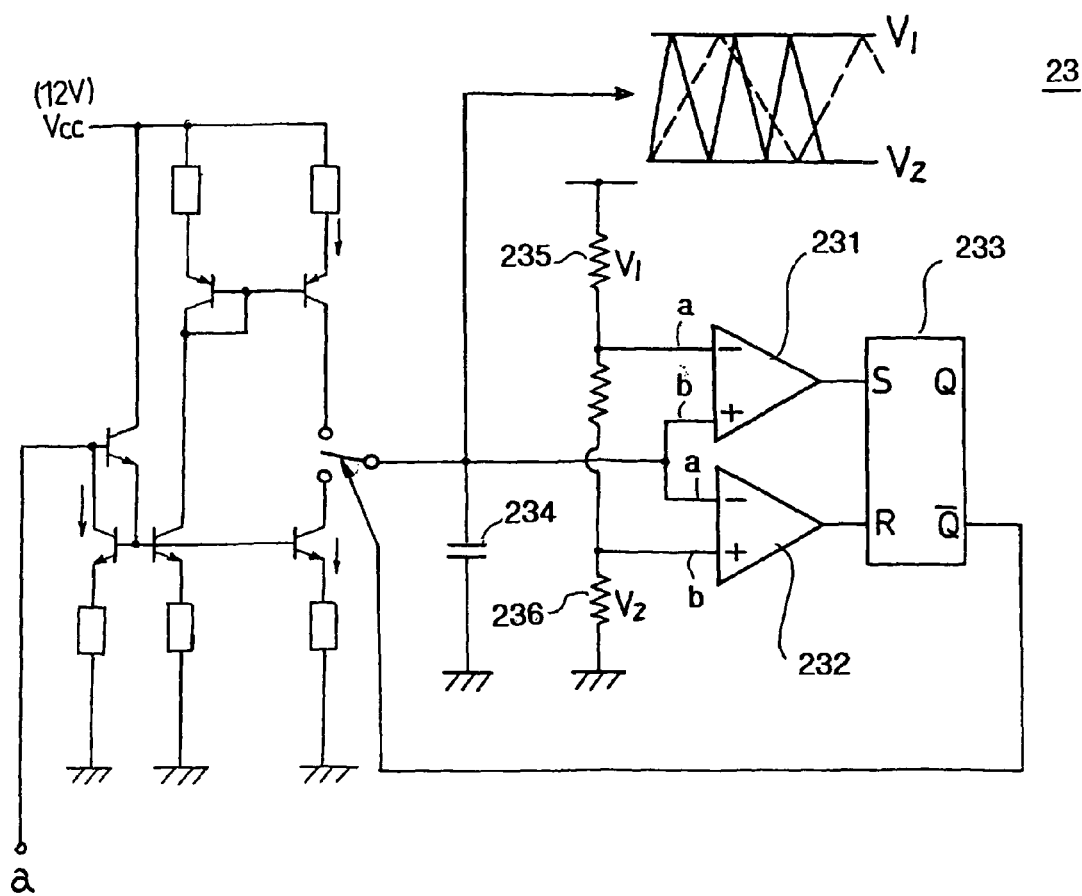
FIG. 11 is a block diagram of the oscillation circuit shown in FIG. 5.

FIG. 11 is an example of the oscillation circuit 23. The oscillation circuit 23 comprises a pair of comparators 231 and 232. A voltage V1 of a potential divider 235 is provided to an inverted input terminal a (−) of the comparator 231. Voltage V2 of a potential divider 236 is provided to a non-inverted input terminal b (+) of the comparator 232. A voltage of another comparator 234 is provided to a non-inverted input terminal b (+) of the comparator 231 and also to an inverted input terminal a (−) of the comparator 232.

When the potential at the non-inverted input terminals b (+) is lower than the potential of the inverted input terminals a (−), the output is 0. When the potential of the non-inverted input terminals b (+) exceeds the potential of the non-inverted input terminals a (−), the comparators 231 and 232 respectively generate an output 1.

Outputs from a pair of operational amplifiers 231 and 232 are inputted to an S terminal and an R terminal of an SR flip-flop 233. By applying output from a non-Q terminal of the SR flip-flop 233, a charge and discharge circuit of a capacitor 234 is formed.

As shown in FIG. 11, when a charge circuit of the capacitor 234 is formed, the potential of the capacitor 234 rises. When the potential of the capacitor 234 is outputted, potential at the non-inverted input terminal b (+) of the comparator 231 rises, and then, when the potential exceeds the potential V1 at the non-inverted input terminal a (−), an output 1 is applied to the terminal S, and then, based on the voltage output from the non-Q terminal, a discharge circuit of the capacitor 234 is formed. Henceforth, potential of the capacitor 234 declines, and then the declined potential of the capacitor 234 is output. Accordingly, potential at the non-inverted input terminal b (+) of the comparator 232 also declines. When the declined potential falls below V2 at the inverted input terminal a (−), an output 1 is applied to the terminal R, and then, by applying the output voltage of the non-Q terminal, a charge circuit of the capacitor 234 is formed.

Based on the above arrangement, charge and discharge potential of the capacitor 234 is output, thereby securing a triangular waveform oscillating circuit 23. Slope of the triangular waveform is determined by the magnitude of charge current Ir.

An inverter circuit for the high frequency heating apparatus driven by the bridged dual transistors according to the present invention is not limited to the one shown in FIG. 5, however, such an resonant type circuit type inverter circuit using switching elements consisting of an arm comprising the bridged dual transistors may also be applied.

Figure 12:
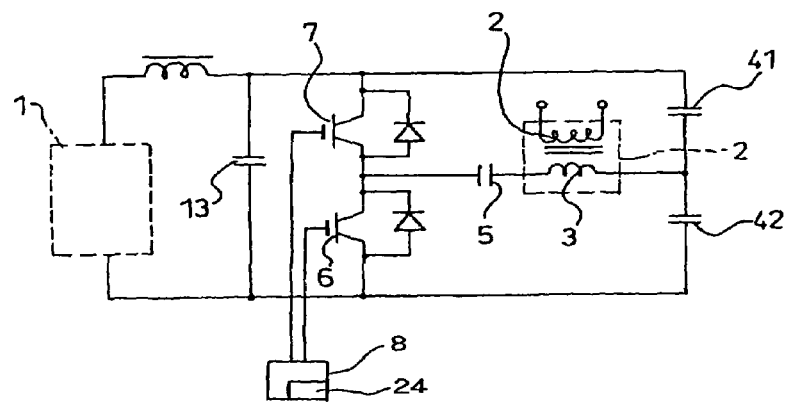
FIG. 12 are 3 other examples for the resonance type high frequency heating apparatus driven by the bi-transistor bridged circuit.
Figure 12:
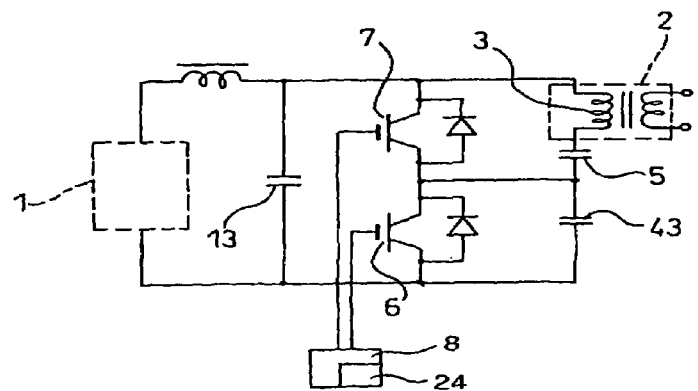
Figure 12:
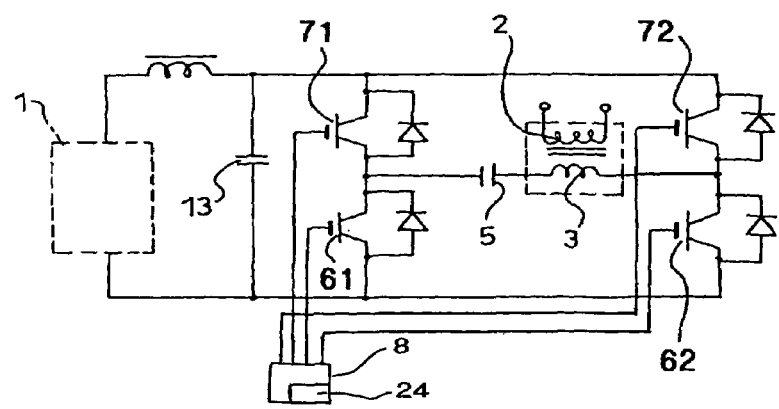

FIG. 12 shows three types of the inverter circuits. In FIG. 12(a), a direct current power supply 1 applies a direct current voltage VDC by rectifying full waves of the commercial power supply to the series connection circuit consisting of a first semiconductor switching element 6 and a second semiconductor switching element 7. Between a connecting point of the first capacitor 41 and a second capacitor 42, and a connecting point of first and second semiconductor switching elements 6 and 7, a series connection circuit consisting of a primary coil 3 of a leakage transformer 2 and a third capacitor 5 is connected. Controlling signals from a drive system 8 are respectively applied to the bases of the first semiconductor switching element 6 and the second semiconductor switching element 7. The drive system 8 is internally provided with a variable dead time preparation circuit 24 according to the present invention. Illustrations of a secondary coil of the leakage transformer 2 and a magnetron are omitted.

With the variable dead time preparation circuit 24, the dead time is made constant or minutely increased at a predetermined switching frequency or less, and the dead time is increased sharply at a predetermined switching frequency or more. Owing to this arrangement, it is possible to provide an inverter circuit that hardly causes the above semiconductor switching elements to incur thermal loss and noise.

In FIG. 12(b), after rectifying full waves of the commercial power supply, the direct current power supply 1 applies a direct current voltage VDC to a series connection circuit consisting of the primary coil 3 of the leakage transformer 2, the first capacitor 5, and the second capacitor 43 and also to another series connection circuit comprising the first semiconductor switching element 6 and the second semiconductor switching element 7. Intervals between the connecting point of the first capacitor 5 and the second capacitor 43 and the other connecting point of the first semiconductor switching element 6 and the second semiconductor switching element 7 are short circuited. Controlling signals from a drive system 8 are respectively applied to the bases of the first semiconductor switching element 6 and the second semiconductor switching element 7. The drive system 8 is internally provided with a variable dead time preparation circuit 24 according to the present invention. Illustrations of a secondary coil of the leakage transformer 2 and a magnetron are omitted.

With the variable dead time preparation circuit 24, the dead time is made constant or minutely increased at a predetermined switching frequency or less, and the dead time is increased sharply at a predetermined switching frequency or more. Owing to this arrangement, it is possible to provide an inverter circuit that hardly causes the above semiconductor switching elements to incur thermal loss and noise.

FIG. 12(c) shows a full-bridge circuit.

In FIG. 12(c), after rectifying full waves of the commercial power supply, the DC power source 1 applies a direct current voltage VDC to a series connection circuit consisting of a first semiconductor switching element 61 and a second semiconductor switching element 71 and also another series connection circuit consisting of a third semiconductor switching element 62 and a fourth semiconductor switching element 72. Between a connecting point of the first and second semiconductor 61 and 71 and a connecting point of a third and fourth semiconductor switching elements 62 and 72, a series connection circuit consisting of a primary coil 3 of a leakage transformer 2 and a third capacitor 5 is connected. It is allowable to omit the third capacitor 5. Controlling signals from a drive system 8 are respectively applied to the bases of the first semiconductor switching element 61 and the second semiconductor switching element 71, the third semiconductor switching element 62 and the fourth semiconductor switching element 72. The drive system 8 is internally provided with a variable dead time preparation circuit 24 according to the present invention. Illustrations of a secondary coil of the leakage transformer 2 and a magnetron are omitted.

With the variable dead time preparation circuit 24, the dead time is made constant or minutely increased at a predetermined switching frequency or less, and the dead time is increased sharply at a predetermined switching frequency or more. Owing to this arrangement, it is possible to provide an inverter circuit that hardly causes the above semiconductor switching elements to incur thermal loss and noise.

Figure 13:
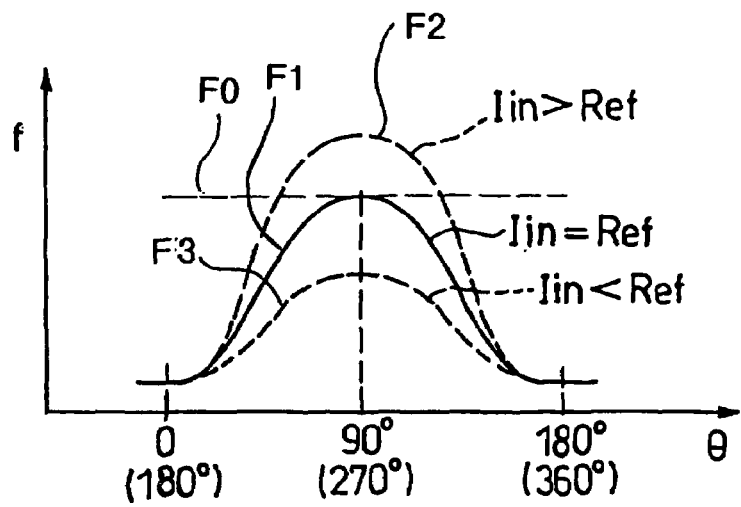
FIG. 13 is a line chart showing the phase characteristics of the inverter circuit according to the present invention with respect to frequency.

FIG. 13 is a diagram showing the "phase characteristics with respect to frequency of the inverter circuit according to the present invention. In FIG. 13, the frequency is reduced in the vicinity of the phase of 0 or 180 degrees with a low voltage, whereas the frequency is increased in the vicinity of the phase of 90 degrees or 180 degrees. This allows the frequency to be reduced in the vicinity of the zero phase or 180 degrees of the phase with a low voltage, based on the use frequency characteristics with respect to current shown in FIG. 1, output current (voltage) increases. Conversely, as the voltage is quite high in the vicinity of the phase of 90 degrees and 270 degrees of, by maximizing the frequency, based on the frequency characteristics with respect to current shown in FIG. 1, output current (voltage) is narrowed. As a result, as shown in FIG. 14, the output voltage is approximate to an uniform value throughout the phases of 0~180 degrees (or 180~360 degrees).

Figure 1:
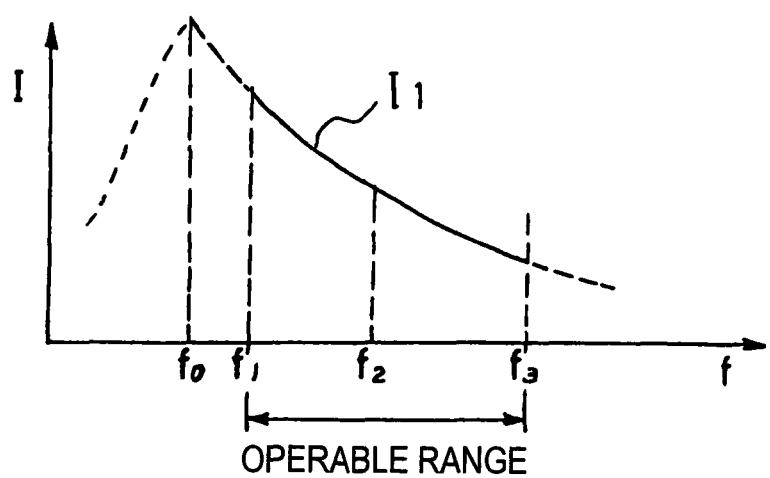
FIG. 1 is a line chart showing use frequency characteristics with respect to current when a predetermined voltage is applied to an inverter resonance circuit according to the present invention.

On the other hand, in a case where the phase characteristics with respect to frequency are not changed with respect to the phase shown by a dotted line F0 in FIG. 13, the frequency is large in the vicinity of the phase of 0 or 180 degrees with a low voltage, and thus, based on the "use frequency characteristics with respect to current shown in FIG. 1, the output current (voltage) remains small. As a result, as shown by a dotted line V1 in FIG. 14, a sufficient voltage cannot be secured in the vicinity of the phase of zero or 180 degrees.

The solid line F1 is a diagram showing the phase characteristics with respect to frequency in the case where an input current Ri (FIG. 5) for which an alternate current used for generation of a direct current power supply is moved out by a CT is made equal to the reference current Ref without errors. The dotted line F2 is a diagram showing the phase characteristics with respect to frequency in the case where the input current Ri is greater than the reference current Ref and the frequency is increased within the usable range shown in FIG. 1. The dotted line F3 is a diagram showing the phase characteristics with respect to frequency in the case where the input current Ri is smaller than the reference current Ref, and the current is increased by lowering the frequency within the usable range shown in FIG. 1.

Figure 14:
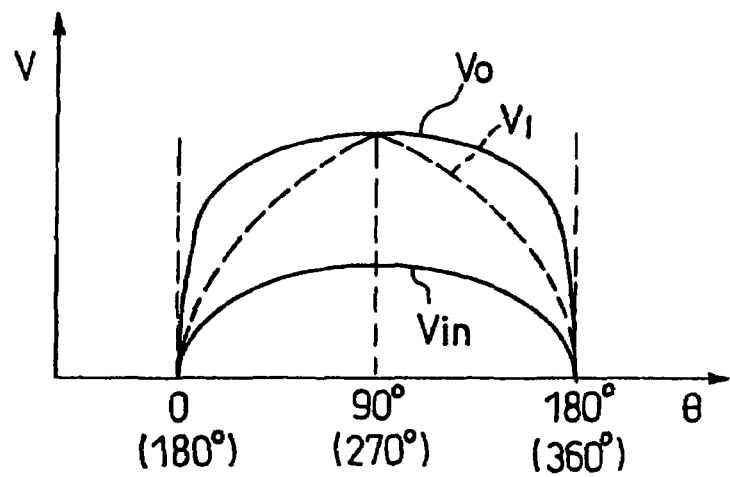
FIG. 14 is a line chart showing the phase characteristics of the inverter circuit with respect to output voltage.

In FIG. 14, the solid curved line Vin is a voltage waveform of the commercial power supply. The dotted line V1 shown above is a voltage waveform which is switched at a predetermined frequency throughout all the phases. The solid curved line V0 is a voltage (the secondary voltage of the pressure raising transformer) applied with a frequency modulation as shown in FIG. 13. Although respective ratios of the Vin, V1, and V0, significantly differ from each other, for visual convenience, these lines are shown on an identical diagram. The dotted curved line V1 shows the voltage at the secondary coil of a pressure raising transformer when the frequency is constant without being subjected to modulation like the dotted line F0 shown in FIG. 13. However, the waveform does not conform to the non-linear load of the magnetron. On the other hand, as shown in the diagram F1 in FIG. 13, the frequency is reduced in the vicinity of the phase of zero or 180 degrees with a low voltage, and conversely, the frequency is increased in the vicinity of the phase of 90 degrees or 180 degrees, thereby enabling an output current (or voltage) to be large in the vicinity of the phase of zero or 180 degrees. Conversely, an output current or voltage is narrowed in the vicinity of the phase of 90 degrees or 270 degrees. Thus, as shown from the solid curved line V0 in FIG. 14, it is arranged that a constant voltage can be generated at the secondary coil of a pressure raising transformer in all the phases ranging from 0 to 180 degrees or from 180 degrees to 360 degrees. The waveform V0 conforms to the non-linear load of the magnetron.

Even when the switching elements (IGBT) 6 and 7 shown in FIG. 5 are duty-controlled, the variable dead time preparation circuit 24 is still effective for controlling the dead time. The reason is described below. In order to control the dead time by way of jointly increasing or lowering the collector potentials VQ7C and VQ8C, it is suggested that the center voltage V6 shall be varied, thereby varying the ON/OFF ratio of a pair of transistors Q8 and Q7, in other words, making it possible to control duty ratio thereof. Concretely, when the duty ratio of the transistors Q8 and Q7 is 50:50 (when the transistors Q8 and Q7 are respectively operated with 6V of voltage based on the 12V of the direct current power supply), maximum output is secured. On the other hand, when the operating voltage is below or above 6V, this causes the collector voltages VQ8C and VQ7C to simultaneously rise and fall in conjunction with each other, thus varying the ON/OFF ratio of the transistors Q8 and Q7 to cause the output to be decreased. However, even in this case, where as the offset voltage generated in the resistors R8 and R7 remains invariable, the voltage remains as a constant level. Accordingly, it is understood that the variable dead time preparation circuit 24 is also effective for varying the dead time even when the duty ratio is controlled.

INDUSTRIAL APPLICABILITY

As described above, according to the present invention, a high frequency heating apparatus comprising: a direct current power supply; a series connection circuit consisting of a pair of semiconductor switching elements (IGBT) connected in parallel to the direct current power supply; another series connection circuit consisting of a primary coil of a leakage transformer and a capacitor connected to both ends of one of a pair of the semiconductor switching elements; another capacitor connected to both ends of the other of the pair of the semiconductor switching elements; a drive means for driving a pair of the above semiconductor switching elements; a rectifying means connected to a secondary coil of the leakage transformer; and a magnetron connected to the rectifying means, wherein the drive means is internally provided with a variable dead time preparation circuit, which allows a period for which the two semiconductor switching elements simultaneously are turned OFF to vary in response to the switching frequency. Concretely, by the dead time to be increased in response to a rise in the switching frequency, or to be constant or to be increased minutely, to be increased sharply at a predetermined switching frequency or more, or by allowing a constant value or a minutely increased value of the dead time or the value of the switching frequency serving as an inflection point to be variable, or the sharply increased value of the dead time to be variable, an inverter circuit which can hardly cause the semiconductor switching elements to incur generation of thermal loss and noise, and that can prevent energy from wastefully being consumed can be obtained.

The invention claimed is:
1. A high frequency heating apparatus for driving a magnetron, comprising,
a direct current power supply;
a series circuit comprising a pair of semiconductor switching elements; and
a resonance circuit connected with a primary coil of a leakage transformer and a capacitor;

in which the series circuit is connected to the direct current power supply in parallel, and, in an AC equivalent circuit, an end of the resonance circuit is connected to an intermediate point of one end of the series circuit and the other end is connected to an end of the direct current power supply, and further comprising, a drive means for driving the respective semiconductor switching elements;

a rectifying means, which is connected to a secondary coil of the leakage transformer; and a magnetron, which is connected to the rectifying means, wherein a variable dead time preparation circuit which allows a period for which respective semiconductor switching elements are simultaneously turned off to vary in response to a switching frequency is provided, wherein the variable dead time preparation circuit allows the dead time to increase in response to a rise in the switching frequency when the switching frequency is greater than or equal to a predetermined switching frequency, and wherein the variable dead time preparation circuit allows the dead time to remain constant or to increase minutely as a function of the switching frequency when the switching frequency is less than the predetermined switching frequency.

2. A high frequency heating apparatus for driving a magnetron, comprising, a direct current power supply;

two sets of series circuits each consisting of a pair of semiconductor switching elements; and a resonance circuit connected with a primary coil of a leakage transformer and a capacitor;

in which two sets of the series circuits are respectively connected to the direct current power supply in parallel, and an end of the resonance circuit is connected to an intermediate point of the one end of series circuits and the other end thereof is connected to an intermediate point of the other direct current power supply, and further comprising, a drive means for driving the respective semiconductor switching elements;

a rectifying means, which is connected to a secondary coil of the leakage transformer; and a magnetron, which is connected to the rectifying means, wherein a variable dead time preparation circuit which allows a period for which respective semiconductor switching elements are simultaneously turned off to vary in response to a switching frequency is provided, wherein the variable dead time preparation circuit allows the dead time to increase in response to a rise in the switching frequency when the switching frequency is greater than or equal to a predetermined switching frequency, and wherein the variable dead time preparation circuit allows the dead time to remain constant or increase minutely as a function of the switching frequency when the switching frequency is less than the predetermined switching frequency.

3. A high frequency heating apparatus for driving a magnetron, comprising, a direct current power supply;

a series circuit consisting of a pair of semiconductor switching elements; and a resonance circuit connected with a primary coil of a leakage transformer and a capacitor;

in which the series circuit is connected to the direct current power supply in parallel, and the resonance circuit is connected in parallel to one of the semiconductor switching elements, and further comprising, a drive means for driving the respective semiconductor switching elements;

a rectifying means, which is connected to a secondary coil of the leakage transformer; and a magnetron, which is connected to the rectifying means, wherein a variable dead time preparation circuit which allows a period for which respective semiconductor switching elements are simultaneously turned off to vary in response to a switching frequency is provided, wherein the variable dead time preparation circuit allows the dead time to increase in response to a rise in the switching frequency when the switching frequency is greater than or equal to a predetermined switching frequency, and wherein the variable dead time preparation circuit allows the dead time to remain constant or increase minutely as a function of the switching frequency when the switching frequency is less than the predetermined switching frequency.

4. A high frequency heating apparatus according to any one of claims 1 through 3, wherein the variable dead time preparation circuit allows dead time to increase sharply at the predetermined switching frequency or more.

5. A high frequency heating apparatus according to any one of claims 1 through 3, wherein the constant value or the minutely increased value of the dead time is variable below the predetermined switching frequency.

6. A high frequency heating apparatus according to claim 4, wherein the sharply increased value of the dead time is variable above the predetermined switching frequency.

7. A high frequency heating apparatus according to any one of claims 1 through 3, wherein a value of the predetermined switching frequency to which the variable dead time preparation circuit compares the switching frequency is variable.

8. A high frequency heating apparatus according to any one of claims 1 through 3, wherein the variable dead time preparation circuit allows the dead time to increase stepwise in response to the rise in the switching frequency.

9. A high frequency heating apparatus according to any one of claims 1 through 3, wherein the variable dead time preparation circuit prepares dead time based on plus or minus offset voltages which vary by a first slope in proportion to an increase in the switching frequency and further vary from the predetermined switching frequency by a second slope.

10. A high frequency heating apparatus according to any one of claims 1 through 3, wherein the variable dead time comprises: a VCC power supply, a duty controlled power supply, a first current which varies in proportion to the switching frequency, a second current which flows from the predetermined switching frequency and varies in proportion to the switching frequency, a third current which is obtained by synthesizing the first and second currents and multiplying the result by a predetermined coefficient, and an upper and lower potential preparation means for preparing upper and lower potentials which are obtained by adding plus and minus offset potentials in proportion to the third current to the duty controlled power supply, wherein the dead time is prepared based on the upper and lower potentials.

11. A high frequency heating apparatus according to claim 10, wherein at least either voltage of the duty controlled power supply or the switching frequency varies so as to control input power or input current.

12. A high frequency heating apparatus for driving a magnetron, which is comprised of a frequency-controlled type resonance inverter circuit having at least an arm including semiconductor switching elements;

the high frequency heating apparatus further comprises a variable dead time preparation circuit, which allows a period for which the respective semiconductor switching elements are simultaneously turned off to vary in response to a switching frequency;

wherein, the variable dead time preparation circuit prepares a dead time based on plus and minus offset voltages which vary by a first slope in proportion to an increase in the switching frequency and further vary from a predetermined switching frequency by a second slope, wherein the variable dead time preparation circuit allows the dead time to increase in response to a rise in the switching frequency when the switching frequency is greater than or equal to the predetermined switching frequency, and wherein the variable dead time preparation circuit allows the dead time to remain constant or increase minutely as a function of the switching frequency when the switching frequency is less than the predetermined switching frequency.

* * * * *